(12) United States Patent  
Stewart

(10) Patent No.: US 6,409,163 B1
(45) Date of Patent: Jun. 25, 2002

(54) FIXTURING DEVICE FOR HOLDING A WORKPIECE

(75) Inventor: Max E. Stewart, Plainfield, IN (US)

(73) Assignee: Contour Hardening, Inc., Indianapolis, IN (US)

( * ) Notice: Subject to any disclaimer, the term of this patent is extended or adjusted under 35 U.S.C. 154(b) by 0 days.

(21) Appl. No.: 09/597,100

(22) Filed: Jun. 20, 2000

(51) Int. Cl.$^7$ .................................................. B23Q 3/18

(52) U.S. Cl. ...................... 269/224; 269/268; 269/275; 269/285

(58) Field of Search ............................... 269/224, 268, 269/275, 285

(56) References Cited

U.S. PATENT DOCUMENTS 4,448,406 A * 5/1984 Hallberg et al. ............ 269/224

\* cited by examiner

Primary Examiner—Robert C. Watson
(74) Attorney, Agent, or Firm—Woodard, Emhardt, Naughton, Moriarty & McNett

(57) ABSTRACT

A fixturing device for holding a workpiece for processing by an induction hardening machine includes a first subassembly constructed and arranged to be attached to an induction coil subassembly which is movable into and out of position around the workpiece. A second subassembly, virtually identical in construction to the first subassembly, is attached to the induction coil assembly and the two subassemblies are spaced apart so as to face one another and so as to define therebetween a workpiece-receiving region. Each subassembly includes an L-shaped bracket with one leg configured for attachment to the induction coil assembly and the other leg configured with connecting rods for attachment to a holding block. There are three connecting rods, two in the form of cylindrical pins, and one, the center connecting rod, being externally threaded for connecting a holding block to the L-shaped bracket. The two cylindrical pins receive coil springs so as to spring bias the holding block. The threaded connecting rod receives a hex nut for setting the initial spring tension of the holding block relative to its movement toward the L-shaped bracket. The workpiece to be processed by the induction hardening machine is to be positioned between upper and lower centers. The procedure for utilization of the fixturing device is to place the workpiece on the lower center and then push the upper portion of the workpiece in between the two holding blocks, allowing these blocks to separate for added clearance by compressing the coil springs in each subassembly until the workpiece is properly aligned, at which point the upper center is lowered into position.

12 Claims, 6 Drawing Sheets

FIXTURING DEVICE FOR HOLDING A WORKPIECE

BACKGROUND OF THE INVENTION

The present invention relates in general to holding and fixturing devices associated with machining stations, machine tools, processing machines, and workpieces. More specifically the present invention relates to a fixturing device for holding a workpiece which is loaded into an induction hardening machine and which is to be processed by the induction hardening machine while positioned between upper and lower supporting centers. The present invention is described in the context of an induction hardening machine and a workpiece which is mounted between upper and lower centers (i.e., end support shafts). However, the disclosed fixturing device is believed to have broader applicability to a wider range of workpieces and a greater variety of machining centers, machine tools, and processing machines.

One of the considerations in the handling of workpieces is the safety of the machine operator. When workpieces are to be loaded into the machine and unloaded from the machine, it is important that the machine functions be disengaged. When the loading or unloading of the workpiece is completed, the machine functions are then reengaged, such that the operator, and in particular the hand of the operator, is out of harm's way.

Another consideration in the handling of workpieces is the weight of the workpiece, how the workpiece must be manipulated in order to get it properly positioned and fixtured into the machine, and the repetitive nature of the tasks of loading and unloading workpieces one after another. With the potential for a carpal tunnel injury, or at least carpal tunnel-related problems due to repetitive stress motions, it is desirable to make the handling of the workpiece as simple as possible in order to reduce the potential for injury to the machine operator.

The fixturing device of the present invention, which is specifically configured for holding a shaft-like workpiece, is used in an induction hardening machine. In this specific application, the safety concerns are addressed and the handling of the workpiece is simplified which reduces or minimizes the risk of carpal tunnel injury. The workpiece is ultimately supported between upper and lower shaft-like centers when the induction heating process is performed. However, before the upper center is lowered into position and after it is raised out of engagement with the workpiece, the fixturing device, according to the present invention, holds the workpiece in a proper orientation, not allowing it to tilt in any direction off of its longitudinal axis. By means of the fixturing device, the workpiece is held in a proper orientation so that as the upper center is lowered, there is correct alignment with the workpiece, automatically.

A still further consideration for the design of a suitable fixturing device is its ability to accommodate different sizes of workpieces or at least different sizes of that portion of the workpiece which is held by the fixturing device. As will be described, the fixturing device of the present invention uses a pair of opposed holding blocks to actually contact a cylindrical surface of the workpiece and thereby maintain the workpiece in a true axial orientation. Since the fixturing device is not required to establish full surface contact around the workpiece, a variety of workpiece sizes can be handled without needing to change the fixturing device. Additionally, the holding blocks are spring loaded and configured so as to be movable such that the holding blocks effectively open as the workpiece is inserted and, then through spring tension, close to contact the portion of the workpiece to be held. By properly positioning the fixturing device and making the device balanced and symmetrical on each side of the workpiece, the workpiece is held in a true axial orientation by contact with the holding blocks so that the lowering of the upper center finds the end recess in the workpiece for support of the workpiece during the induction heating and hardening process.

SUMMARY OF THE INVENTION

A fixturing device for holding a workpiece for processing by a machine according to one embodiment of the present invention comprises a first subassembly constructed and arranged to be attached to a movable portion of the machine and a second subassembly also constructed and arranged to be attached to the movable portion. The first and second subassemblies are arranged on opposite sides of the workpiece location and each subassembly includes an attachment member, a holding block, connecting means for connecting the holding block to the attachment member with a predetermined spacing therebetween, and spring biasing means for spring loading the holding block at the predetermined spacing. Both the connecting means and the spring biasing means are constructed and arranged to permit movement of the holding block toward the attachment member. The first and second subassemblies are constructed and arranged so that the holding block of the first subassembly and the holding block of the second subassembly are directed at each other and spaced apart so as to define a workpiece-receiving region therebetween One object of the present invention is to provide an improved fixturing device for holding a workpiece.

Related objects and advantages of the present invention will be apparent from the following description.

DESCRIPTION OF THE PREFERRED EMBODIMENTS

Figure 1:
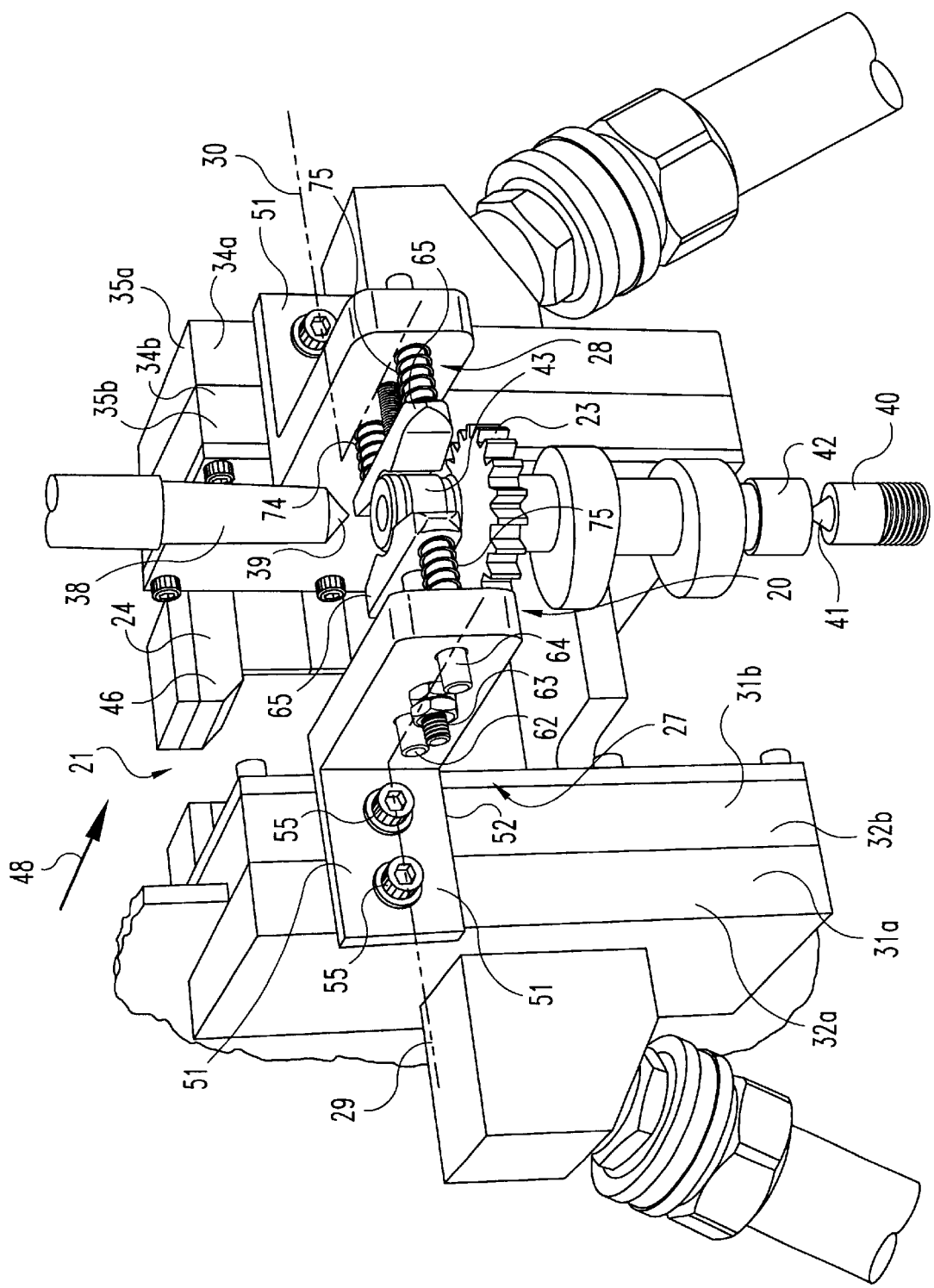
FIG. 1 is a perspective view of a fixturing device for holding a workpiece according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
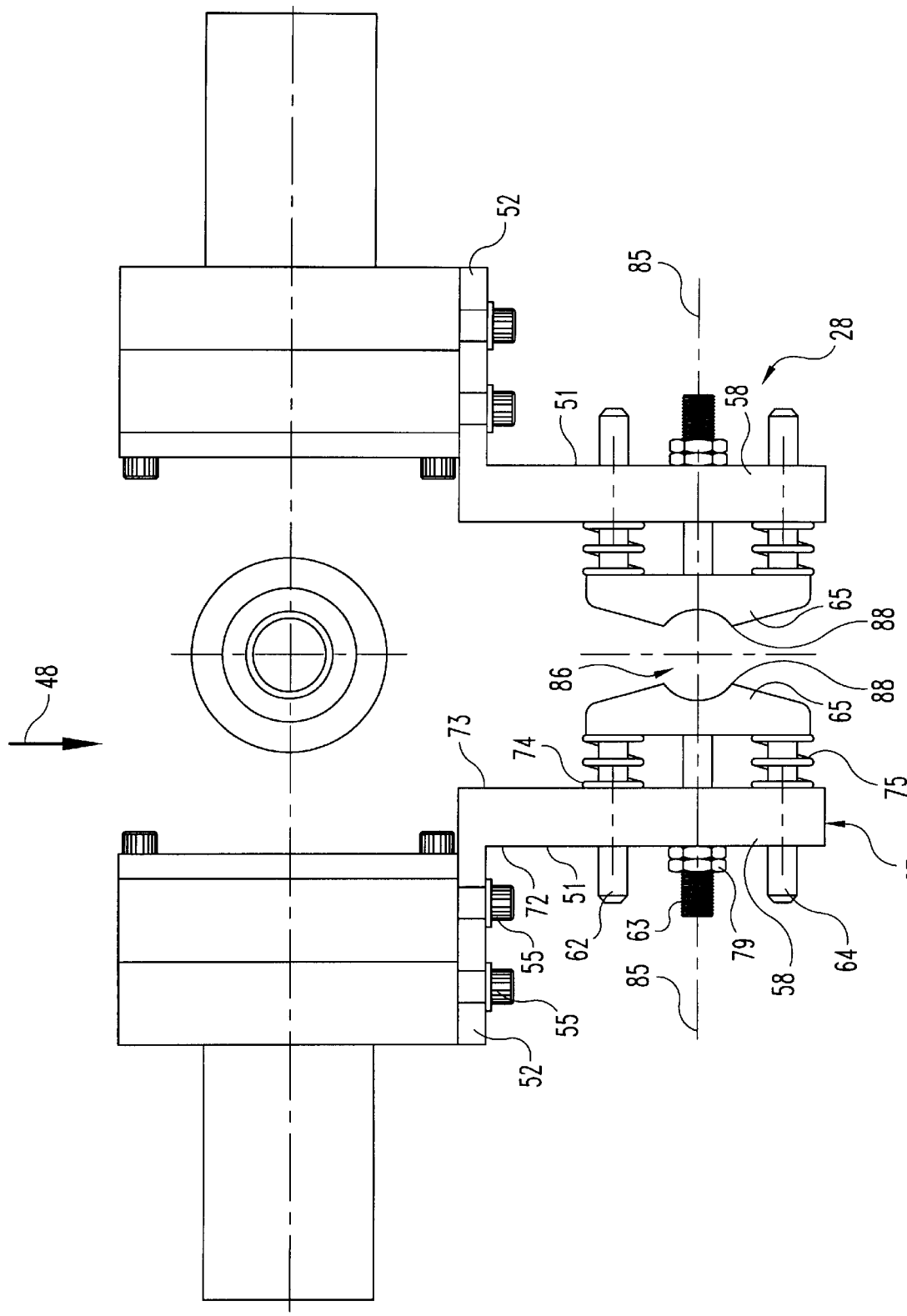
FIG. 2 is a top plan view of the FIG. 1 fixturing device.
Figure 3:
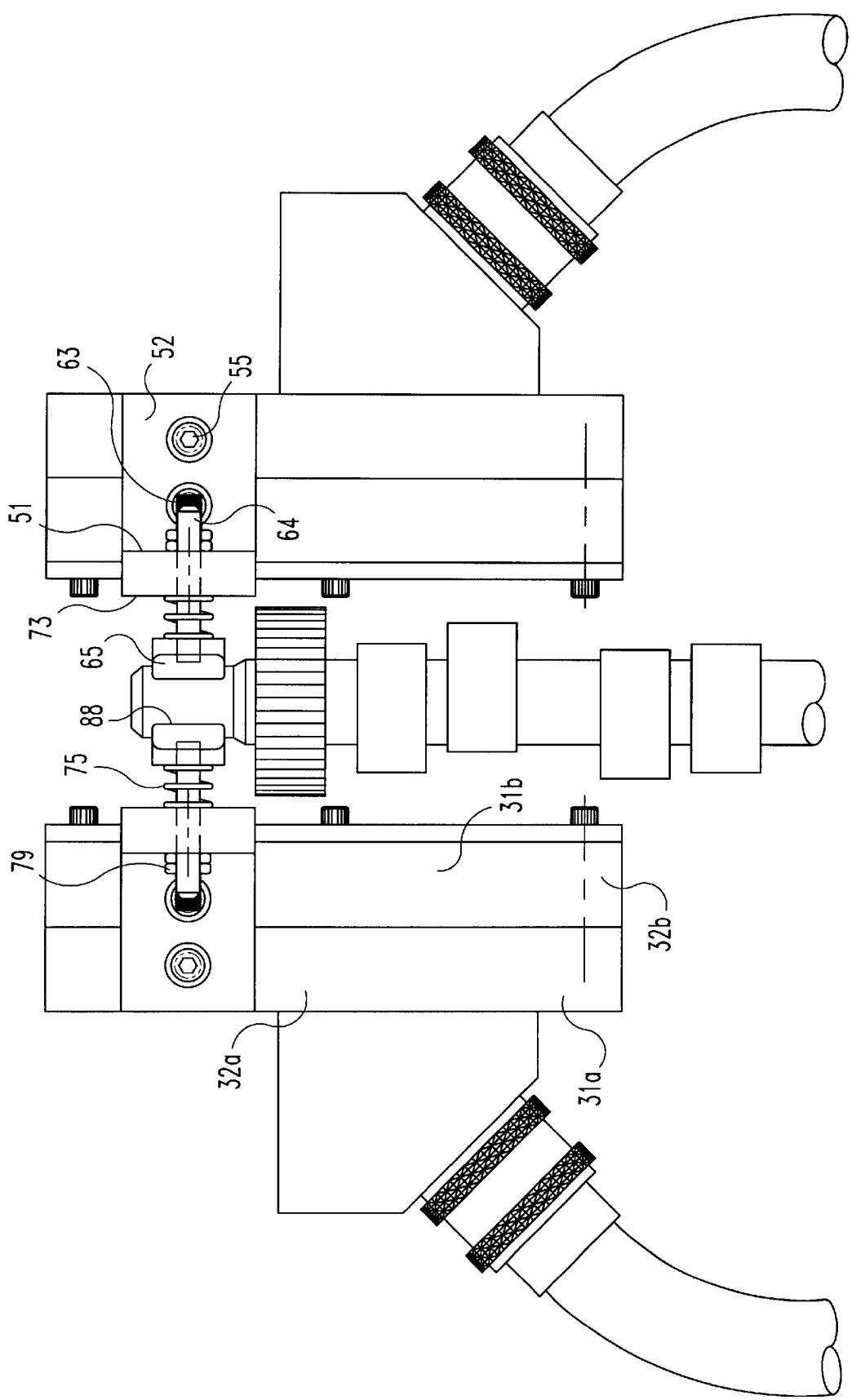
FIG. 3 is a front elevational view of the FIG. 1 fixturing device.

Referring to FIGS. 1, 2, and 3, there is illustrated a fixturing device 20 which is mounted to and associated with a processing machine 21 for a workpiece 22. In the preferred embodiment, processing machine 21 is an induction hardening machine and the workpiece is a camshaft with a drive gear 23 adjacent one end. Included as part of induction hardening machine 21 is a movable induction coil assembly 24.

Fixturing device 20 includes two subassemblies 27 and 28 which are virtually identical. Since each subassembly is symmetrical top to bottom about a horizontal centerline plane (defined by broken lines 29 and 30), the two subassemblies 27 and 28 can be used interchangeably. One reason to separately number these two subassemblies is to be able to more easily refer to the left-side subassembly as item 27 and the right-side subassembly as item 28. Further, since these two items cooperate with one another to hold the workpiece, it is important to have a pair of subassemblies in the preferred embodiment. Depending on the particular style of workpiece to be processed by the machine, and depending on the configuration of the machine and other fixturing which may be present, it is envisioned that a single subassembly could be utilized for holding of a workpiece, consistent with the teachings of the present invention.

Subassembly 27 is securely attached to the front surfaces 31*a* and 31*b* of left-side support plates 32*a* and 32*b* of induction coil assembly 24. Similarly, subassembly 28 is securely attached to the front surfaces 34*a* and 34*b* of right-side support plates 35*a* and 35*b* of induction coil assembly 24. Once secured in place, the two subassemblies 27 and 28 are positioned so as to face each other and so as to define a part-receiving area or zone. Due to the radiused curvature of the center portion of each subassembly, the defined part-receiving zone is substantially cylindrical, thereby corresponding to the shape of the portion of the workpiece to be positioned between subassemblies 27 and 28.

Machine 21 includes an axially movable upper centering shaft 38 with a generally conical, pointed tip 39. The lower centering shaft 40 also includes a generally conical, pointed tip 41. The lower centering shaft 40 is typically fixed as contrasted to being movable or spring loaded. However, in certain processing arrangement it may be desirable to axially raise and lower the workpiece as supported between centers. In this case the lower centering shaft 40 would be movable. In use, the "lower" end 42 of the workpiece 22 is positioned onto centering shaft 40 such that tip 41 fits into a compatibly shaped recess in end 42. The cylindrical shaft portion 43 of workpiece 22 is positioned between subassemblies 27 and 28 and held in axial alignment until the upper centering shaft 38 is lowered into position in the recessed end of portion 43 in order to secure the workpiece between axially-aligned centers.

In order to inductively heat the workpiece, or at least a portion of the workpiece, the induction coil 46 of the induction coil assembly 24 must be moved into position around that portion of the workpiece. As the coil 46 moves toward the workpiece, the subassemblies 27 and 28 are pushed outwardly in the direction of arrow 48, away from the workpiece and away from the remainder of machine 21. As this movement occurs, the two spring-biased holding blocks (see blocks 65 in FIG. 2) separate by moving in a direction that is substantially normal to the direction of arrow 48. At this stage in the process, the workpiece remains held securely between the axially-aligned centering shafts 38 and 40 and can be processed in the normal manner as any workpiece might be processed when supported between aligned centers. Because the workpiece is held securely between the aligned centers, pushing the fixturing device 20 out of engagement around the workpiece does not alter or otherwise affect the positioning of the workpiece. This allows the induction heating and hardening process to be performed in the normal manner. The manner in which the two subassemblies 27 and 28 cooperate to first receive and hold the workpiece in an upright orientation and then move out of engagement with the workpiece will be described hereinafter in connection with the detailed description of the construction of subassemblies 27 and 28.

Figure 4:
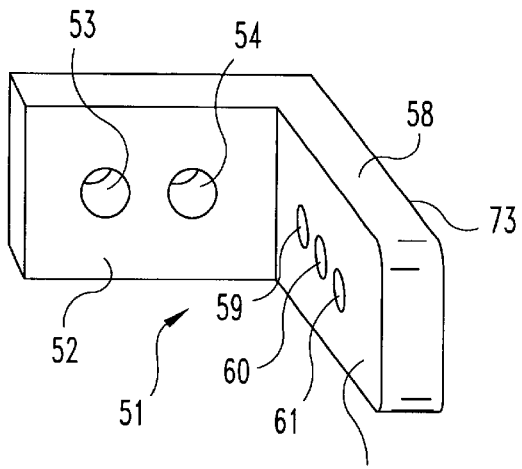
FIG. 4 is a perspective view of an L-shaped bracket comprising one portion of the FIG. 1 fixturing device according to the present invention.

Subassembly 27 (noting that subassembly 28 is virtually identical) includes an L-shaped bracket 51 (see FIG. 4) with a first portion 52 for mounting to the front surface 31*a* of plate 32*a* and to the front surface 31*b* of plate 32*b*. A pair of clearance holes 53 and 54 are provided in first portion 52 for receipt of threaded fasteners or other mounting hardware. In the FIG. 1 illustration of fixturing device 20, subassemblies 27 and 28 are attached to the support plates 32*a*, 32*b* and to support plates 35*a* and 35*b* of the induction coil assembly 24 by the use of Allen head bolts 55.

The second portion 58 of subassembly 27 includes three clearance holes 59, 60, and 61 for the receipt of connecting pins or rods 62, 63, and 64 in order to operably attach holding block 65 to second portion 58.

Holding block 65 (see FIGS. 5, 6, and 7) includes a substantially flat first surface 68 into which three blind holes 69, 70, and 71 are drilled. Holes 69 and 71 are closely toleranced receiving holes for connecting rods 62 and 64, respectively, which rods are preferably ground cylindrical pins. In the preferred embodiment which is illustrated, connecting rods 62 and 64 measure approximately 0.25 inches in diameter. One end of rod 62 is inserted into blind hole 69 with a closely sized slip fit and extends through clearance hole 59 in second portion 58. The opposite end of rod 62 extends beyond surface 72 of second portion 58. Assembled onto rod 62 and positioned between holding block 65 and surface 73 of second portion 58 is a coil spring 74. Coil spring 74 is sized such that holding block 65 is spring loaded (i.e., biased), spaced apart and pushed away from second portion 58 so that the holding block 65 can move under a sufficient load in the direction of second portion 58 by acting against the spring force established by coil spring 74.

In a similar manner, one end of rod 64 is inserted into blind hole 71 with a closely sized slip fit and extends through clearance hole 61 in second portion 58. The opposite end of rod 64 extends beyond surface 72. Assembled onto rod 64 and positioned between holding block 65 and surface 73 is a coil spring 75. Coil spring 75 is sized such that holding block 65 is spring loaded (i.e., biased), spaced apart and pushed away from second portion 58 so that holding block 65 can move, under a sufficient load, in the direction of second portion 58.

Connecting rod 63 is actually an externally-threaded rod and blind hole 70 is internally threaded, according to the preferred embodiment of the present invention, so as to securely receive one end of rod 63 by threaded engagement. This allows rod 63 to be securely connected or attached to holding block 65. The opposite end of rod 63 extends through clearance hole 60 and beyond surface 72 of second portion 58. A pair of hex nuts 79 are threaded onto rod 63 and are threadedly advanced to a predetermined location on rod 63 based upon the initial spring preload which is desired in coil springs 74 and 75. Since the position of the hex nut 79 on rod 63 can be adjusted or readjusted at any time, the spring preload on block 65, due to coil springs 74 and 75, can also be selectively controlled. As should be understood, the coil springs 74 and 75 tend to push holding block 65 away from bracket 51, specifically the second portion 58 of bracket 51, and this pushing away by springs 74 and 75 is stopped when the hex nuts 79 abut up against second portion 58. Further, and as would be understood, as the holding block 65 is pushed or drawn closer to second portion 58 and as the hex nuts are advanced so as to abut up against second portion 58, the preload on the two coil springs 74 and 75 increases. This increases the requisite load on block 65 which would be required in order to move the block 65 closer to the second portion 58 in order to increase the distance of separation between block 65 of subassembly 27 and block 65 of subassembly 28.

Figure 5:
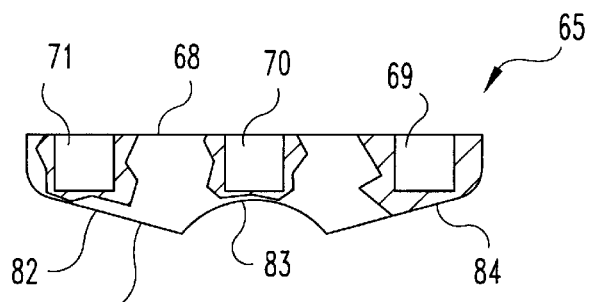
FIG. 5 is a top plan view of a holding block which comprises one portion of the FIG. 1 fixturing device according to the present invention.
Figure 6:
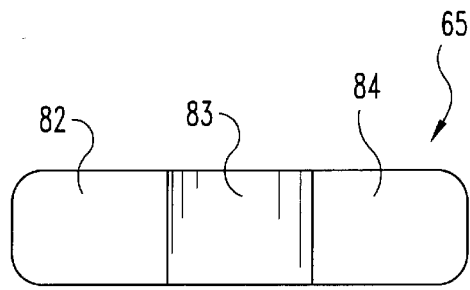
FIG. 6 is a front elevational view of the FIG. 5 holding block.
Figure 7:
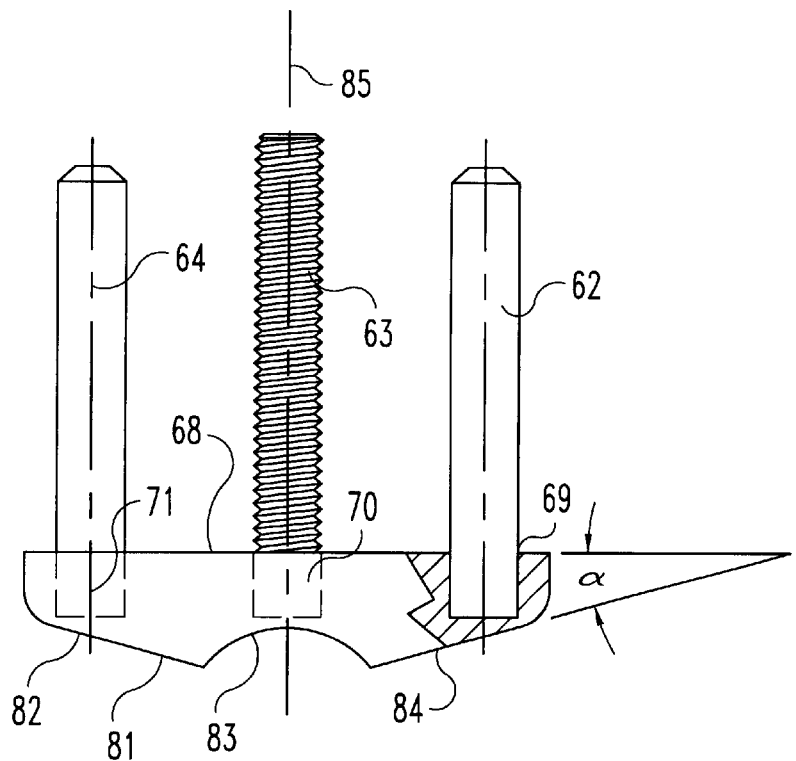
FIG. 7 is a top plan view of a plurality of connecting rods assembled into the FIG. 5 holding block according to the present invention.

With continued reference to FIGS. 5, 6, and 7, the workpiece contacting surface 81 of block 65 is shaped with a first ramp portion 82, a radiused portion 83, and a second ramp portion 84. The axial centerline 85 of connecting rod 63 and of blind hole 70 defines a centerline for block 65. Surface 81 is symmetrical on each side of centerline 85. Each ramp portion is substantially flat and oriented on a incline relative to first surface 68 such that the included angle ($\alpha$) with the plane of surface 68 is approximately 15 degrees. Radiused portion 83 which is centered between the two ramp portions 82 and 84 has a radius measurement of approximately 0.80 inches. While the facing surfaces 81 can be configured to actually clamp onto portion 43, this degree of holding force is not necessary. It is simply required to maintain axial alignment. Accordingly, the spring tension and the corresponding holding force is controlled more by the size and weight of the workpiece.

With further reference to the design of fixturing device 20, as illustrated in FIG. 2, the two subassemblies 27 and 28, as mounted to the induction coil assembly 24, are used to align and position the workpiece. The radiused portion 83 of subassembly 27 opens toward and faces the radiused portion 83 of subassembly 28. By aligning centerline 85 of subassembly 27 with centerline 85 of subassembly 28 and by setting the proper spacing between the two subassemblies 27 and 28, the two radiused portions 83 define a substantially cylindrical region 86. It is this circular region that receives the cylindrical shaft portion 43 of the workpiece. Preferably, the radiused curvature of portions 83 and their spacing is predetermined and selected based upon the diameter of the cylindrical shaft portion 43 to be held in an upright orientation by and between the two subassemblies 27 and 28. By proper sizing of the radius dimension for portion 83 and by proper spacing of the two facing holding blocks 65, the defined region 86 is cylindrical and can actually be designed to match the size and shape of portion 43.

Without the benefit of fixturing device 20, one method of loading the workpiece into the machine would be to manually position the lower end 42 onto centering shaft 40 and then hold the upper portion, such as shaft portion 43, hopefully in the correct axial orientation, and then lower the upper centering shaft 38 into the recessed end of portion 43 to secure the workpiece 22 between axially-aligned centers. This method presents a risk to the machine operator because the upper portion of the workpiece must be held in the correct axial orientation by the hand of the operator while a moving part, the upper centering shaft 38, travels toward the end of the workpiece and accordingly toward the hand of the operator which is holding that end of the workpiece. While it might be possible to substitute some type of robotic arm or mechanical holder for the hand of the operator in order to remove the risk of injury, the time and cost of this type of handling arrangement would substantially increase the overall cost of the operation and the handling convenience would decrease.

Another method of loading the workpiece into the machine would be to spring load the upper centering shaft 38 so that its normal, extended position would be close to its final holding position for the workpiece. Upon insertion of the workpiece 22, the operator needs to engage the pointed tip 39 with the recess in the upper end of portion 43 and then push up on the upper centering shaft 38 in order to create clearance between the lower centering shaft 40 and the lower end of the workpiece. Once this clearance is created, then the lower end 42 is positioned onto the tip 41 of centering shaft 40 and the workpiece can then be released. The spring biased nature of the upper centering shaft 38 causes final alignment of the upper and lower centering shafts by simply releasing the workpiece. Unfortunately, the repetitive nature of the loading and unloading motions which are required, combined with the lifting force required to raise the spring-biased upper centering shaft, results in carpal tunnel injuries to the operators.

The present invention solves these workpiece loading problems in a unique and novel way using fixturing device 20. The fixturing device 20 is assembled and positioned relative to machine 21 such that the radiused portions 83 of the two subassemblies 27 and 28 define the receiving location for shaft portion 43. Since the workpiece is supported by lower centering shaft 40, the holding force of the two subassemblies 27 and 28 can be minimal. These two subassemblies simply have to keep the workpiece from tilting out of axial alignment until the upper centering shaft is lowered into position into the end recess in portion 43. Accordingly, the spring tension can be relatively light and thereby make it quite easy to snap the shaft portion into the generally cylindrical region 86 between the two radiused portions 83 of blocks 65. The facing of first ramp portions 82 provide an easy point of entry for the shaft portion 43 of the workpiece. The facing nature of these first ramp portions 82 provides a tapering or wedge-shaped insertion space which helps to manually guide the workpiece into region 86. As the workpiece is inserted, the blocks 65 are able to move toward their respective brackets 51 and thereby increase the spacing between edges 88 and permit passage of portion 43 into region 86. As would be understood, with a relatively light spring tension established by coil springs 74 and 75, based upon the spring characteristics and the spacing between the holding blocks 65 and second portions 58, the insertion of the workpiece can be done easily and efficiently with a minimum of pushing force required. The holding blocks 65 are able to move easily toward the second portions 58, thereby providing additional clearance between edges 88 and permitting passage of the workpiece.

When it is time to move the induction coil assembly into position around the workpiece, the induction coil assembly 24 moves outwardly and this causes the two subassemblies 27 and 28 to be pushed forward and move out of engagement with the workpiece. The forward motion of the two subassemblies 27 and 28 is actually outwardly away from the workpiece and away from the remainder of the processing machine. The workpiece is able to easily exit from region 86 at the opposite end of each block 65 in much the same manner as the workpiece was manually inserted into region 86. The spring biased movement of the blocks 65 toward their respective brackets 51 opens the clearance between blocks for the workpiece to exit. Once the induction heating process is concluded, the induction coil assembly 24 moves back into its originating position and, as this occurs, the two subassemblies 27 and 28 are pulled back into engagement with the workpiece. When it is time to remove the processed workpiece, the upper centering shaft is retracted (i.e., raised) and the workpiece is easily pulled out of its spring loaded position between the facing blocks 65 of the two subassemblies 27 and 28. The steps prior to processing the workpiece are performed in reverse order after the processing of the workpiece.

As an alternative to this removal procedure for the workpiece, it would be possible to incorporate other handling or discharge mechanisms if it is desired to remove the workpiece at a time when its temperature may be too high to be safely handled. If alternative handling and removal mechanisms are employed, then the two subassemblies 27 and 28 would simply remain in their forward position, disengage from the workpiece, and allow the workpiece to be separately removed from the machine. At this point, everything would be moved back to the originating or starting position so that a new workpiece could be manually loaded into fixturing device 20.

Figure 9:
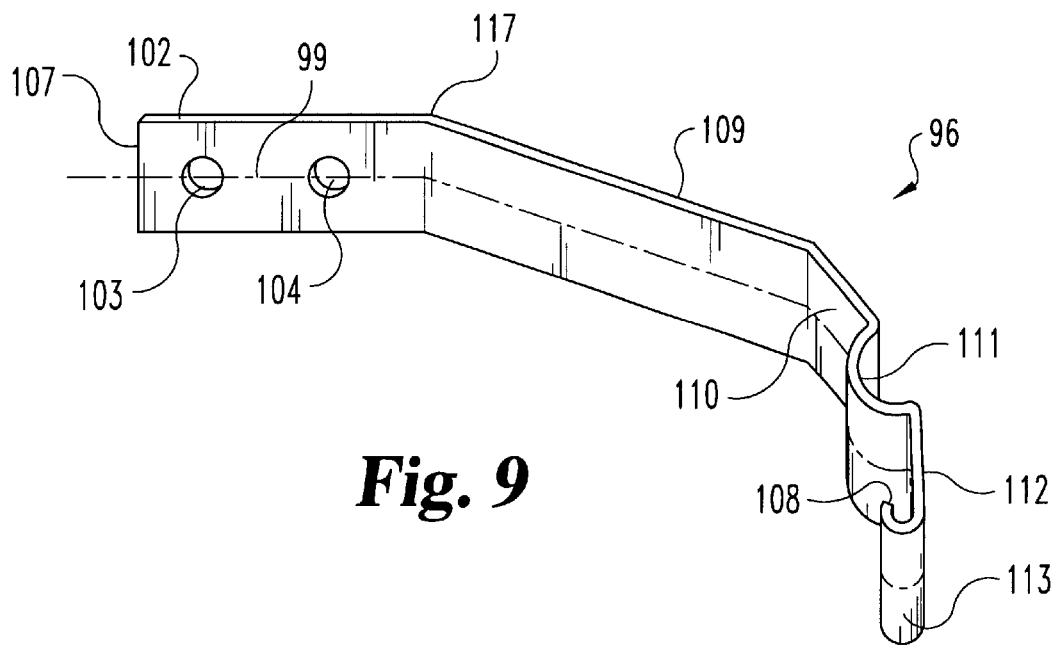
FIG. 9 is a perspective view of a holding clip which comprises one portion of the FIG. 8 fixturing device.
Figure 8:
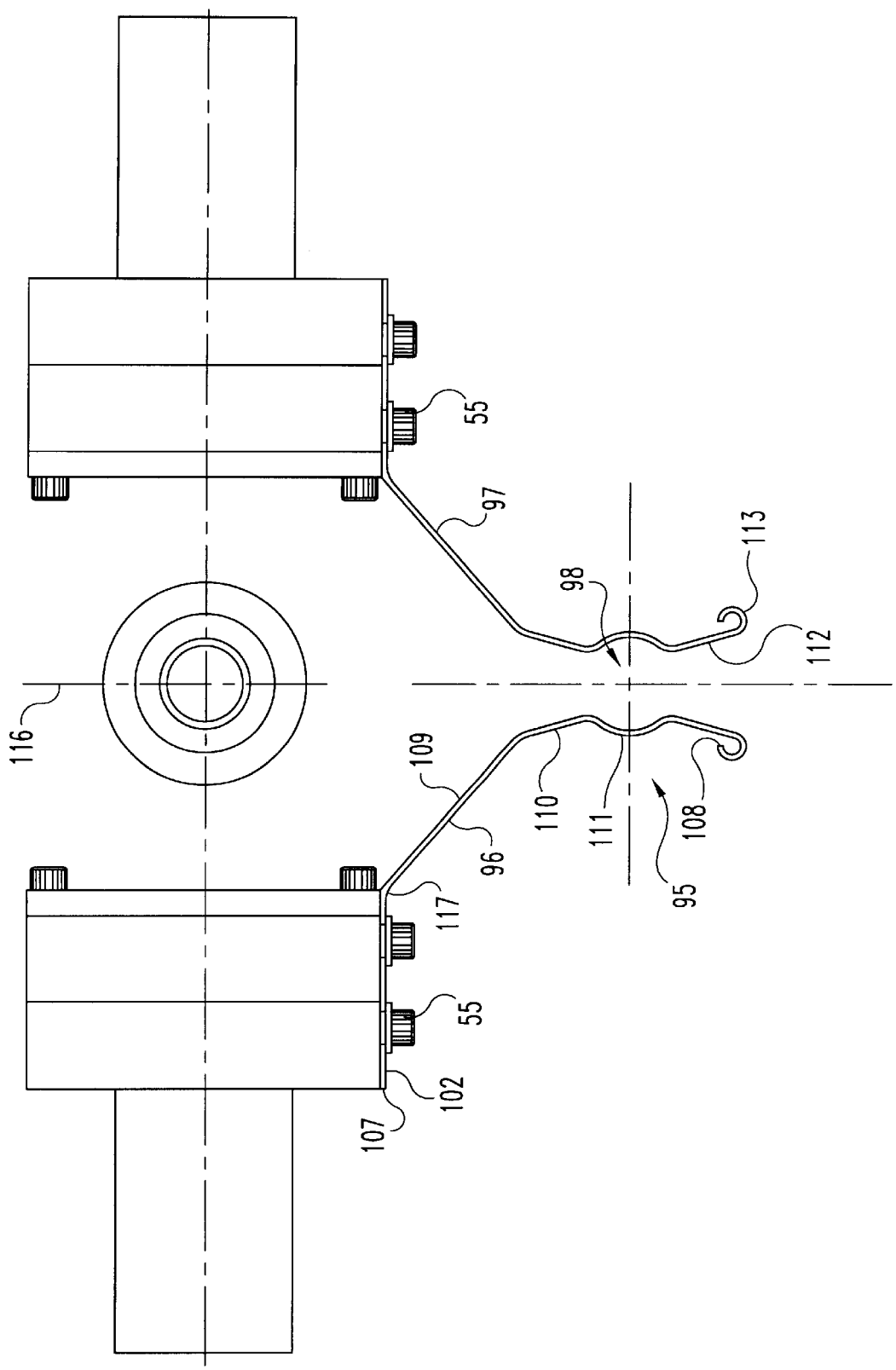
FIG. 8 is a top plan view of an alternative fixturing device embodiment according to the present invention.

An alternative embodiment of the present invention is illustrated in FIGS. 8 and 9. The fixturing device 95 which is illustrated in FIGS. 8 and 9 includes a pair of spring clip holding bands 96 and 97 which are arranged so as to define a generally cylindrical workpiece-receiving area or zone 98. Band 96 and band 97 are virtually identical to each other and are symmetrical about a horizontal centerline 99. Due to this symmetry, band 96 (or band 97) may be used for either or both bands.

Band 96, noting that bands 96 and 97 are virtually identical to each other in construction and function, includes a first portion 102 which defines a pair of mounting holes 103 and 104 for attachment to support plates 32*a* and 32*b* by means of suitable mounting hardware. The location of hole 103 coincides with the front surface 31*a* of plate 32*a*. The location of hole 104 coincides with the front surface 31*b* of plate 32*b*. Allen head bolts 55 are used to secure each band 96 and 97 to their corresponding support plates.

While bands 96 and 97 are unitary in construction, there are various bends and curved portions as well as straight or flat portions. Beginning with end 107 and progressing to end 108, the construction of bands 96 and 97 begins with flat portion 102 which is used for mounting the corresponding band to the corresponding support plate. This portion is followed by a bend and then flat portion 109, another bend and then flat portion 110, another bend and radiused portion 111, another bend and flat portion 112, and concluding with coiled portion 113. Due to the opposed or facing arrangement of bands 96 and 97 and due to their side-to-side symmetry about machine centerline 116, the two radiused portions 111 define the generally cylindrical workpiece-receiving zone 98.

Each band 96 and 97 is fabricated out of a relatively stiff spring steel, allowing it to maintain its fabricated form and yet resiliently flex and move in response to a sufficient force or load. Once that load is removed, the band returns or springs back to its "normal" orientation as is illustrated in FIG. 8. When a workpiece is positioned between radiused portions 111, the bands 96 and 97 only return to the point that contact with the workpiece is made and this provides for the holding of the workpiece in a vertical orientation.

The bend angles are selected and the mounting locations are determined based in part on the diameter size of the cylindrical portion of the workpiece to be captured between the two (facing) radiused portions 111. As will be understood, the size of the defined zone 98 is preferably smaller than the shaft diameter of the workpiece to be held. In this way, the workpiece cannot tilt off axis as would be possible if the defined zone was larger in diameter than the portion of the workpiece placed between radiused portions 111. Upon insertion of the workpiece, each band 96 and 97 is able to flex around its corresponding pivot point 117 in order to increase the separation distance between radiused portions 111 and thereby allow for receipt of the shaft portion of the workpiece to be held.

Consistent with the procedure and sequence of steps associated with FIGS. 1–3 and the use of fixturing device 20, the workpiece is pushed into zone 98. Facing portions 112 help guide the workpiece and due to the slightly larger diameter of the shaft portion to be held, relative to the size of the defined zone 98, band 96 springs out or pivots in a clockwise direction around pivot point 117. Band 97 springs out or pivots in a counterclockwise direction around its corresponding pivot point 117. The bands then spring back to capture the workpiece.

When the induction hardening coil is moved into position around the workpiece, the bands push forward, allowing the held shaft portion of the workpiece to exit the defined zone 98 by way of facing portions 110. At this point in the process, the upper centering shaft has been moved into position, thereby holding the workpiece and enabling the bands 96 and 97 to actually disengage from the workpiece.

When the workpiece has been processed and the coil returns, the reverse sequence of steps is performed. The workpiece returns to zone 98 by pushing through the narrow opening between facing portions 110. The workpiece can be unloaded by pulling it out of the zone 98 by way of facing portions 112. Any travel of the workpiece into or out of zone 98 causes flexing and movement of bands 96 and 97. It is the spring steel properties of the band material, the shape of the bands, and the spacing between bands which provide sufficient holding force in order to maintain the workpiece in a proper axial alignment until the upper centering shaft 38 is lowered into position.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fixturing device for holding a workpiece for processing by a machine comprising:
   a first subassembly constructed and arranged to be attached to a movable portion of said machine;
   a second subassembly constructed and arranged to be attached to said movable portion;
   said first subassembly and said second subassembly each including an attachment member, a holding block, connecting means for connecting said holding block to said attachment member with a predetermined spacing between said holding block and said attachment member and spring biasing means for spring loading said holding block at said predetermined spacing;

said connecting means and said spring biasing means being constructed and arranged to permit movement of said holding block toward said attachment member; and said first and second subassemblies being constructed and arranged to be attached to said movable portion such that the holding block of said first subassembly and the holding block of said second subassembly are directed at each other and spaced apart so as to define a workpiece-receiving region therebetween.

2. A fixturing device for holding a workpiece for processing by a machine comprising:

a first subassembly constructed and arranged to be attached to a movable portion of said machine;

a second subassembly constructed and arranged to be attached to said movable portion;

said first subassembly and said second subassembly each including an attachment member, a holding block, connecting means for connecting said holding block to said attachment member with a predetermined spacing between said holding block and said attachment member and spring biasing means for spring loading said holding block at said predetermined spacing, each attachment member being constructed and arranged as an L-shaped bracket with first mounting means for attachment to said movable portion and second mounting means for attachment to said holding block;

said connecting means and said spring biasing means being constructed and arranged to permit movement of said holding block toward said attachment member; and said first and second subassemblies being constructed and arranged to be attached to said movable portion such that the holding block of said first subassembly and the holding block of said second subassembly are directed at each other and spaced apart so as to define a workpiece-receiving region therebetween.

3. The fixturing device of claim 2 wherein said holding block includes a workpiece-contacting surface and wherein the workpiece-contacting surface of said first subassembly is oriented so as to face the workpiece-contacting surface of said second subassembly for defining said workpiece-receiving region.

4. The fixturing device of claim 3 wherein said connecting means includes a plurality of connecting rods each having one end received by said holding block and another portion received by said attachment member, said connecting means further including a threaded rod attached to said holding block and extending through said attachment member.

5. The fixturing device of claim 4 wherein said spring biasing means includes a first coil spring assembled onto one of said plurality of connecting rods and a second coil spring assembled onto a second one of said plurality of connecting rods.

6. The fixturing device of claim 1 wherein said holding block includes a workpiece-contacting surface and wherein the workpiece-contacting surface of said first subassembly is oriented so as to face the workpiece-contacting surface of said second subassembly for defining said workpiece-receiving region.

7. A fixturing device for holding a workpiece for processing by a machine comprising:

a first subassembly constructed and arranged to be attached to a movable portion of said machine;

a second subassembly constructed and arranged to be attached to said movable portion;

said first subassembly and said second subassembly each including an attachment member, a holding block, connecting means for connecting said holding block to said attachment member with a predetermined spacing between said holding block and said attachment member and spring biasing means for spring loading said holding block at said predetermined spacing;

said connecting means and said spring biasing means being constructed and arranged to permit movement of said holding block toward said attachment member;

said first and second subassemblies being constructed and arranged to be attached to said movable portion such that the holding block of said first subassembly and the holding block of said second subassembly are directed at each other and spaced apart so as to define a workpiece-receiving region therebetween; and said holding block including a workpiece-contacting surface, wherein the workpiece-contacting surface of said first subassembly is oriented so as to face the workpiece-contacting surface of said second subassembly for defining said workpiece-receiving region, and said workpiece-contacting surface of said holding block including a first ramp portion, a second ramp portion, and a radiused portion between said first ramp portion and said second ramp portion.

8. A fixturing device for holding a workpiece for processing by a machine comprising:

a first subassembly constructed and arranged to be attached to a movable portion of said machine;

a second subassembly constructed and arranged to be attached to said movable portion;

said first subassembly and said second subassembly each including an attachment member, a holding block, connecting means for connecting said holding block to said attachment member with a predetermined spacing between said holding block and said attachment member and spring biasing means for spring loading said holding block at said predetermined spacing, said connecting means including a plurality of connecting rods each having one end received by said holding block and another portion received by said attachment member, said connecting means further including a threaded rod attached to said holding block and extending through said attachment member;

said connecting means and said spring biasing means being constructed and arranged to permit movement of said holding block toward said attachment member; and said first and second subassemblies being constructed and arranged to be attached to said movable portion such that the holding block of said first subassembly and the holding block of said second subassembly are directed at each other and spaced apart so as to define a workpiece-receiving region therebetween.

9. The fixturing device of claim 8 wherein said plurality of connecting rods includes two cylindrical pins each having a slip fit assembly at one end into a receiving hole in said holding block and an opposite end extending through and beyond a receiving hole in said bracket.

10. The fixturing device of claim 1 wherein said spring biasing means includes a first coil spring assembled onto one of a plurality of connecting rods which are disposed between said holding block and said attachment member and a second coil spring assembled onto a second one of said plurality of connecting rods.

11. A fixturing device for holding a workpiece for processing by a machine comprising:

a first subassembly constructed and arranged to be attached to a movable portion of said machine;

a second subassembly constructed and arranged to be attached to said movable portion;

said first subassembly and said second subassembly each including an attachment member, a holding block, connecting means for connecting said holding block to said attachment member with a predetermined spacing between said holding block and said attachment member and spring biasing means for spring loading said holding block at said predetermined spacing;

spring force adjustment means for selectively varying said predetermined spacing;

said connecting means and said spring biasing means being constructed and arranged to permit movement of said holding block toward said attachment member; and said first and second subassemblies being constructed and arranged to be attached to said movable portion such that the holding block of said first subassembly and the holding block of said second subassembly are directed at each other and spaced apart so as to define a workpiece-receiving region therebetween.

12. A fixturing device for holding a workpiece for processing by a machine comprising:

a first subassembly constructed and arranged to be attached to a movable portion of said machine;

a second subassembly constructed and arranged to be attached to said movable portion;

said first subassembly and said second subassembly each including an attachment member, a holding block, connecting means for connecting said holding block to said attachment member with a predetermined spacing between said holding block and said attachment member and spring biasing means for spring loading said holding block at said predetermined spacing, said attachment members each being attached to said movable portion of said machine in a fixed position such that said attachment members remain with a fixed distance of separation between each other;

said connecting means and said spring biasing means being constructed and arranged to permit movement of said holding block toward said attachment member; and said first and second subassemblies being constructed and arranged to be attached to said movable portion such that the holding block of said first subassembly and the holding block of said second subassembly are directed at each other and spaced apart so as to define a workpiece-receiving region therebetween.

\* \* \* \* \*